United States Patent [19] [11] 4,399,254
Das et al. [45] Aug. 16, 1983

[54] CATIONIC LATICES USEFUL FOR THERMOPLASTIC AND THERMOSETTING APPLICATIONS

[75] Inventors: Suryya K. Das, Pittsburgh; Charles M. Kania, Tarentum, both of Pa.

[73] Assignee: PPG Industries, Inc., Pittsburgh, Pa.

[21] Appl. No.: 305,590

[22] Filed: Sep. 25, 1981

[51] Int. Cl.$^3$ .............................................. C08K 5/41
[52] U.S. Cl. ...................................... 524/745; 524/157
[58] Field of Search ................. 260/29.6 S; 524/157, 524/745

[56] References Cited

U.S. PATENT DOCUMENTS

| | | | |
|---|---|---|---|
| 2,807,597 | 9/1957 | Sonnenfeld et al. | 260/29.6 SQ |
| 3,108,979 | 10/1963 | Le Fevre et al. | 260/29.6 |
| 3,399,159 | 8/1968 | Samour | 260/29.6 |
| 3,532,658 | 10/1970 | Gintz | 260/29.6 |
| 3,547,950 | 12/1970 | Gander | 260/33.2 |
| 3,617,368 | 11/1971 | Gibbs et al. | 260/29.6 SQ |
| 3,699,069 | 10/1972 | Peaker | 260/29.6 SQ |
| 3,799,902 | 3/1974 | Anderson | 260/29.6 NR |
| 3,817,896 | 6/1974 | Bergmeister et al. | 260/29.6 R |
| 3,824,219 | 7/1974 | Smith et al. | 528/408 |
| 3,830,769 | 8/1974 | Ray-Chaudhuri et al. | 260/29.6 R |
| 3,892,703 | 7/1975 | Burke, Jr. | 260/29.6 R |
| 3,897,381 | 7/1975 | Tugukuni et al. | 260/29.2 TN |
| 3,901,857 | 8/1975 | Sackman et al. | 260/79.3 M |
| 3,941,727 | 3/1976 | Timmerman et al. | 260/8 |
| 4,001,159 | 1/1977 | Imai et al. | 260/29.6 TA |
| 4,008,247 | 2/1977 | Tucker | 260/308 B |
| 4,009,085 | 2/1977 | Woehrle | 204/28 |
| 4,012,353 | 3/1977 | Chasin et al. | 260/29.6 NR |
| 4,056,501 | 11/1977 | Gibbs et al. | 260/29.6 SQ |
| 4,064,091 | 12/1977 | Samour et al. | 260/29.6 HN |
| 4,108,817 | 8/1978 | Lochel, Jr. | 260/29.6 E |
| 4,130,523 | 12/1978 | Hoy et al. | 260/29.6 R |
| 4,132,686 | 1/1979 | Toyoshima et al. | 260/21 |
| 4,138,446 | 2/1979 | Kawakami et al. | 260/875 |
| 4,147,681 | 4/1979 | Lim et al. | 260/29.6 SQ |
| 4,164,489 | 8/1979 | Daniels et al. | 260/29.6 R |
| 4,178,400 | 12/1979 | Lochel, Jr. | 427/435 |
| 4,180,519 | 12/1979 | Neel et al. | 260/459 A |
| 4,195,147 | 3/1980 | Sekmakas et al. | 526/312 |
| 4,207,405 | 6/1980 | Masler et al. | 525/328 |
| 4,224,415 | 9/1980 | Meitzner et al. | 521/38 |

FOREIGN PATENT DOCUMENTS 56-106977 8/1981 Japan .................................. 524/157

Primary Examiner—Joseph L. Schofer
Assistant Examiner—N. Sarofim
Attorney, Agent, or Firm—Godfried R. Akorli

[57] ABSTRACT

A process for preparing stable latices with cationic surfactants having their gegen-ions derived from methanesulfonic acid; the cationic surfactant is present in relatively low but effective concentrations.

3 Claims, No Drawings

CATIONIC LATICES USEFUL FOR THERMOPLASTIC AND THERMOSETTING APPLICATIONS

BACKGROUND OF THE INVENTION

1. Field of the Invention

This invention relates to acrylic cationic latices and the methods of preparing and using the same.

2. Brief Description of the Prior Art

Cationic latices are known in the art and their method of preparation involving free radical emulsion polymerization of monomers in water, in the presence of cationic surfactants, is also known. The free radical emulsion polymerization procedure generally results in high molecular weight polymeric products which are normally in the range of 100,000 to several million. In this molecular weight range, the latices possess good mechanical properties. It has, however, been found that the latices leave something to be desired as to film properties relating to protective durability, i.e., the ability of coatings to maintain their integrity against chemicals, weathering, and the like. These shortcomings are due, at least in part, to the surfactants which are used in the preparation of the latices.

Surfactants are water-soluble, consequently, they render coatings prepared therefrom water-sensitive, especially when they are used in high concentrations. Surfactant, being oligomeric, can exude to the surface of the film giving an oily surface for collection of dirt. Further, the surfactants can reside at the interphase between the substrate and the film, inhibiting adhesion of the film to the surface.

In view of the foregoing, it is desirable to employ surfactant in small but effective concentrations so as to obtain stable and substantially coagulum-free latices. Surfactants which have halo acids as gegen-ions have been found very effective in this regard.

In contrast, surfactants with gegen-ions derived from organic acid, to be effective, have to be used in relatively high concentrations. The present invention provides for an organic acid which can be used in small but effective concentrations to provide latices which are free of the afore-described negatives.

SUMMARY OF THE INVENTION

In accordance with the foregoing, the present invention encompasses a process for preparing a stable cationic acrylic latex; said process comprises copolymerizing ethylenically unsaturated monomers in an acidic medium in the presence of a cationic surfactant in which the gegen-ion of the cationic surfactant is derived from methanesulfonic acid.

Compositions prepared therefrom, particularly coating compositions, are also encompassed by this invention. The compositions can be thermoplastic or thermosetting and have been found to have good substrate adhesion. Representative of curing agents which can be used in thermosetting compositions are blocked isocyanates and aminoplasts. When the thermosetting coating compositions have been applied to substrates and then baked, the cured films have been found to display excellent properties of adhesion, smoothness, gloss retention, non-chalking, chemical and solvent resistance.

In a preferred embodiment, the instant latices comprise amino groups. Coating compositions of the amino group-containing latices have been found to display, in addition to the above, properties of mildew resistance and UV-degradation stability. The characterization of the acrylic latex as "amino group-containing" is used herein to denote that the polymer contains a amino group as an integral part of it. Otherwise, the amino group can be introduced into the compositions of the latex by, say, the use of an amino group-containing reagent, such as a surfactant, which will co-cure with the polymer.

DETAILED DESCRIPTION OF THE INVENTION

The cationic acrylic latex of this invention is prepared by free radical polymerization in an aqueous medium of ethylenically unsaturated monomers in the presence of a cationic surfactant. As is set forth herein, the present invention is characterized by a select group of surfactants which are used during the polymerization of the monomers; said surfactants have their gegen-ions derived from methanesulfonic acid.

The polymerizable monomers can be selected from the group consisting of an active hydrogen group-containing monomer and one or more other monomers different from the above.

The active hydrogen group can be a hydroxyl, amino, amido or thiol group or mixtures thereof. They are incorporated into the polymer, during the preparation thereof, by copolymerizing ethylenically unsaturated monomers containing said active hydrogen groups.

Representative of the active hydrogen group-containing monomers are the hydroxyl group-containing monomers such as hydroxyalkyl acrylates and methacrylates. Preferably, the hydroxyalkyl group contains from about 2 to 4 carbon atoms. Examples thereof are hydroxyethyl acrylate, hydroxyethyl methacrylate, hydroxypropyl acrylate and hydroxypropyl methacrylate.

Examples of the amino group-containing monomer are the same as described hereinafter.

Examples of vinyl monomers containing amido groups are acrylamide, methacrylamide, ethacrylamide, alpha-chloro acrylamide, vinyl acetamide, N-methyl acrylamide, N-ethyl acrylamide and N-methyl methacrylamide.

The vinyl monomers containing the active hydrogens can be used in amounts of 1 to 30, preferably 1 to 10 percent by weight based on total weight of the monomer charge.

Examples of other ethylenically unsaturated monomers which are generally copolymerized with the above monomers are esters of unsaturated organic acids. These monomers can constitute from about 30 to 90, preferably from 40 to 80 percent of the total monomer charge. Representative of said monomers are alkyl acrylates and methacrylates containing from about 1 to 18 carbon atoms in the alkyl group.

The cationic latex can contain a hard polymer segment derived from an alkyl methacrylate containing from 1 to 3 carbon atoms in the alkyl group such as methyl methacrylate and ethyl methacrylate. Also, the cationic latex can contain a soft polymer segment obtained from the use of an alkyl methacrylate containing from 4 to 12 carbon atoms in the alkyl group, for example, butyl methacrylate and hexyl methacrylate, or an alkyl acrylate containing from 1 to 8 carbon atoms in the alkyl group, for example, butyl acrylate and 2-ethylhexyl acrylate. Mixtures of alkyl methacrylates containing from 4 to 12 carbon atoms in the alkyl group and alkyl acrylates containing from 1 to 8 carbon atoms in the alkyl group can also be used.

Another type of ethylenically unsaturated monomer which can be used in preparing the cationic latex constitutes copolymerizable monomeric materials such as styrene, alpha-methyl styrene, alpha-chlorostyrene, allyl chloride and acrylonitrile. This type of unsaturated monomeric materials can constitute about 0 to 60, preferably 0 to 40 percent by weight based on the total weight of the monomer charge.

The cationic latex may optionally contain carboxylic acid moieties which are introduced into the polymer from the use of an alpha, beta-ethylenically unsaturated carboxylic acid which is copolymerizable with the other monomers. Examples of unsaturated carboxylic acids are acrylic acid and methacrylic acid. Examples of other less preferred unsaturated acids are crotonic acid, maleic acid or its anhydride, fumaric acid or itaconic acid. Usually, when these latter-mentioned acids are used, they are used in combination with acrylic or methacrylic acids. It is, however, preferred that the polymer contain little or no carboxyl groups.

Amino group-containing monomers are particularly useful in the preparation of the preferred embodiments of the invention, with the advantages set forth above. The amino group can be primary, secondary, tertiary or quaternary. Representative of the amino group-containing monomers are aminoalkyl acrylates or methacrylates. Preferably, the aminoalkyl group contains from about 1 to 6 carbon atoms in the alkyl radical. Examples thereof are appropriate salts of aminoethyl, aminopropyl and aminohexyl acrylates or methacrylates, N,N-dialkylaminoalkyl acrylates or methacrylates. Also useful are vinyl monocyclic or bicyclic amino compounds including those which have a five or six-membered heterocyclic compound with a nitrogen heteroatom; acrylamideamino modified monomers and quaternary ammonium group-containing monomers.

The amino group-containing monomers can be present for the polymerization in amounts, preferably, from about 0.5 to 10, more preferably from about 1 to 3, and most preferably from about 1.5 to 2.5 percent based on total weight of the monomer charge.

As set forth hereinbefore, the preparation of the acrylic latices of this invention involves the use of surfactants as emulsifiers or stabilizers.

In the present invention, it has been discovered that at relatively low concentrations, surfactants comprising gegen-ions derived from methanesulfonic acid give rise to clear and distinct features of latices prepared therewith. Presently, it has been found that when the surfactant gegen-ion is derived from methanesulfonic acid, relatively small concentrations of the surfactant are needed to produce latices that are stable and substantially coagulum-free.

As would be realized, the latices, thus obtained, are less prone to the negatives which attend the presence of surfactants, particularly in large amounts. Methanesulfonic acid is an organic acid; in the context of this invention, however, it is distinct over other useful organic acids, in the following regard. Even though gegen-ions derived from other organic acids can be used with the hydrophobic portion of the surfactant (such as amine), relatively high concentrations of the surfactant would be needed to prepare stable and substantially coagulum-free latices.

Methanesulfonic acid is, thus, as effective as the art-known inorganic acids which are useful in providing surfactant gegen-ions for the preparation of latices. Surfactants derived from methanesulfonic acid are used in essentially the same amounts as those derived from the art-known and commonly used acids such as HCl.

The surfactants can be of an external or internal type, or both. By external surfactants are meant those which do not constitute an integral part of the resulting acrylic latex polymer backbone. In contrast, by internal surfactants are meant those which do constitute an integral part of the resulting acrylic latex polymer backbone; they are realized through a copolymerization of monomers which are capable of salt formation. It is desired to point out that when the internal surfactants are employed, the salt formation can occur before, during or after polymerization of the monomer.

Typically, the amount of surfactant required varies primarily with the concentration of the monomers to be handled and, to an extent, with the choice of surfactant, monomers, and proportions of the monomers. Usually, the amount of external surfactant is between 0 to 10 percent by weight of the mixture of monomers and is preferably 0.1 to 5 percent by weight. If the latex polymer is to contain none or relatively low amounts of the external surfactant, the amount of the polymerizable monomer giving rise to the internal surfactant will have to be increased compensatorily.

The free radical polymerization initiator is a water-soluble type. Examples include peroxides such as cumene hydroperoxide, t-butyl hydroperoxide; and redox catalysts, which are preferred. The amount of initiator which is employed depends somewhat on the nature of the monomers selected including impurities which may accompany the particular monomers. However, the usual range for free radical initiator is about 0.01 to 3 and preferably 0.05 to 1 percent by weight based on total weight of the monomer mixture.

The cationic latex can be prepared by emulsion polymerization techniques well known in the art. Examples of suitable techniques involve the pre-emulsification technique and the seeding technique. In the pre-emulsification technique, a small amount of water is present in the polymerization vessel together with a polymerization initiator and optionally all or part of the surfactant emulsifying agent. The monomer charge is emulsified in a larger amount of water and is continuously added to the reaction vessel under polymerizing conditions. If all the surfactant is not present initially in the reaction vessel, it can be added simultaneously with the monomer addition. Alternately, the total amount of water may be present in the reaction vessel and the monomer or monomers added in bulk form.

In the seeding technique, a small amount of the monomer charge is added to the reaction vessel along with all or part of the polymerization initiator and all or part of the surfactant and polymerized to form a seed latex. After formation of the seed latex, the remaining polymerization ingredients are added in a continuous manner to the reaction vessel under polymerizing conditions to form the final polymer emulsion.

Generally, the solids content of the cationic latex prepared by the above method will be from about 35 to 65 percent and usually within the range of about 40 to 60 percent. The molecular weight of the latices is usually in the range of 100,000 to about 10 million on a weight average basis, as determined by gel permeation chromatography. Those having molecular weights in the range of 250,000 and above are generally preferred.

The latex of the present invention can contain small amounts, for example, up to 15 percent by weight based on total solvent weight, including water, of an organic solvent. The organic solvent can be added to the acrylic latex either during or after the emulsion polymerization, preferably after the polymerization. These solvents should be selected such that they will not adversely affect rheological qualities or drying rates of the applied films or film continuity. Hydrocarbon solvents can be used, although stable (not reactive) ester, ketone, ether-ester and other types of water-miscible solvents can be used.

The cationic latex prepared by the process described above can be mixed with a minor amount, that is, up to 20 percent by weight based on total latex weight, of thickening agents, stabilizers, anti-foaming agents, preservatives, pigments, pigment extenders and plasticizers, if desired.

The acrylic latices of the present invention can be made thermo-setting in nature by the presence of curing agents. The curing agents can be an integral part of the polymer or they can be external to the polymer.

Curing agents which are integral with the acrylic polymer are described in U.S. Pat. No. 4,166,882, column 3, line 37, to column 4, line 2, incorporated herein by reference, which discloses curing agents which are an integral part of an acrylic polymer which are prepared by including within the monomer charge polymerizable ethylenically unsaturated monomers containing a self-curing group such as N-methylol ether derivatives of acrylic and methacrylic amides. External curing agents can also be used. These curing agents can be aminoplasts as disclosed in U.S. Pat. No. 4,166,882, column 4, line 50, to column 5, line 28, incorporated herein by reference.

The cationic acrylic latices of this invention can be used in the manufacture of paper, textiles, adhesives and the like wherein inherent adhesion to anionic substrates is required.

The thermosetting compositions prepared as described above can be employed in coating compositions which are either clear or pigmented. Pigments which may be used can be any of the conventional types, with the proviso that they do not adversely affect the desirable properties of the paint; the settling property of the paint, for example, would have to be taken into account.

The pigment content of the paint is usually expressed as the pigment-to-binder weight ratio. In the practice of the present invention, the pigment-to-binder weight ratios are as high as 2:1, for most pigmented coatings, are within the range of 0.5 to 1:1.

The cationic latex of the present invention, including pigmented latex, is stable, that is, it is non-sedimenting when stored at 10° to 30° C. If any sediment does form, it is the type which can be redispersed with mild agitation.

Coating compositions as described above are particularly useful for coil coating applications. Coil coating involves the application of the coating composition to a continuous strip of a metallic substrate, usually aluminum or steel. The metal is of relatively light gauge and comes to the coating operation in the form of coils from which it is unwound and continuously coated. After coating, the coil passes into a baking or curing oven where it is cured at relatively high temperatures for a relatively short period of time. The coated article is then passed to further operations where it is fabricated into desirable shapes such as for home and industrial siding as well as automotive and appliance parts.

Although particularly useful in coil coating applications, the thermosetting composition of the cationic latex can be applied to any solid substrate such as glass, porcelain or metals other than steel and aluminum such as copper, brass, and nickel.

Having generally described the features of this invention, the following examples are given to illustrate more fully to those skilled in the art, the practice of this invention without intending any limitations thereby. All parts and percentages are by weight unless otherwise indicated.

EXAMPLES

Example 1

The following example shows the preparation of the acrylic latex of this invention. The following were used in the preparation:

| Reactor Charge | |
|---|---|
| Ingredients | Parts by Weight |
| Deionized water | 616.2 |
| Mix A | 109.3 |
| Feed D | 120.8 |
| Ferric chloride (1.0% aqueous) | 0.3 grams |

| Feed A | |
|---|---|
| Ingredient | Parts by Weight |
| 10% Feed C | 60 |

| Feed B | |
|---|---|
| Ingredient | Parts by Weight |
| Hydrogen peroxide (30% aqueous) | 5.4 |

| Feed C | |
|---|---|
| Ingredients | Parts by Weight |
| Butyl acrylate | 282 |
| Methyl methacrylate | 294 |
| Hydroxypropyl acrylate | 24 |

| Feed D | |
|---|---|
| Ingredients | Parts by Weight |
| Dimethylaminoethyl methacrylate | 7.5 |
| Methanesulfonic acid (70% aqueous) | 6.6 |
| Deionized water | 106.8 |

| Mix A (10% Aqueous) | |
|---|---|
| Ingredients | Parts by Weight |
| Lauryl amine | 4.0 |
| Deionized water | 114.5 |
| Methanesulfonic acid (70% aqueous) | 3.0 |

The reactor charge was heated and agitated under a nitrogen atmosphere to about 56° C., followed by the addition of Feed A. The temperature of the reaction mixture was allowed to rise to 70° C. and then held for 15 minutes at this temperature. Feed B was then added and the addition of Feed C was commenced and continued at the rate of 37.5 ml. per 15 minutes. About 3 minutes from the commencement of the addition of Feed C, the reaction mixture attained a temperature of 76° C., with its color changing to blue indicating the initiation of polymerization. About an hour after the commencement of the addition of Feed C, Feed D was added in three equal portions of 40.6 grams, at one hour intervals, with the temperature maintained at 72° C. With the completion of the addition of Feed C, the reaction mixture was held for another hour within the temperature range of 72°–75° C. Thereafter, the mixture was cooled and then filtered. Resulting was a latex having a pH of 2.9, total resin solids content of 40.1 percent and a Brookfield viscosity of 44.5 centipoises measured with a No. 2 spindle at 20 rpm, measured at 22° C.

Example 2

The following example further shows the preparation of the acrylic latices of the present invention.

| Reactor Charge | | |
| --- | --- | --- |
| Ingredients | | Parts by Weight |
| Deionized water | | 907.2 |
| Feed C | | 90.0 |
| Ferric chloride (1.0% aqueous) | 5.6 parts per million | |
| 10% Feed B | | 148.9 |
| 10% Feed D | | 120.9 |

| Feed A | |
| --- | --- |
| Ingredient | Parts by Weight |
| Hydrogen peroxide (30% aqueous) | 12.5 |

| Feed B | |
| --- | --- |
| Ingredients | Parts by Weight |
| Styrene | 960.0 |
| Hydroxypropyl methacrylate | 518.6 |
| Acrylic acid | 15.0 |

| Feed C | |
| --- | --- |
| Ingredients | Parts by Weight |
| Oleyl amine (85% active) | 10.6 |
| Methanesulfonic acid (70% aqueous) | 4.6 |
| Deionized water | 156.8 |

| Feed D | |
| --- | --- |
| Ingredients | Parts by Weight |
| Dimethylaminoethyl methacrylate | 37.5 |
| Methanesulfonic acid (98% aqueous) | 23.0 |
| Deionized water | 1138.9 |

The reactor charge was agitated and heated to a temperature within the range of about 70°–75° C., followed by the addition of Feed A. The reaction mixture was then held at this temperature until it turned blue in color indicating initiation of polymerization. Feeds B and D were then simultaneously added over a period of 3 hours at the rates of 138 cc. and 8.75 ml. per 15 minutes, respectively. At the completion of the addition of Feeds B and D, the reaction mixture was held for 2 hours at 75° C. Thereafter, the mixture was cooled and then filtered. Resulting was a latex having a resin solids content of 40.6 percent, a pH of about 3.0 and a Brookfield viscosity of 60 centipoises measured at 22° C. with a No. 2 spindle at 50 rpm's.

Example 3

The following example also shows the preparation of the acrylic latices of the present invention. The following were used in the preparation:

| Reactor Charge | | |
| --- | --- | --- |
| Ingredients | | Parts by Weight |
| Deionized water | | 1422 |
| Feed C | | 90.0 |
| Ferric chloride (1.0% aqueous) | 5.6 parts per million | |
| 10% Feed B | | 148.9 |
| 10% Feed D | | 94 |

| Feed A | |
| --- | --- |
| Ingredient | Parts by Weight |
| Hydrogen peroxide (30% aqueous) | 12.5 |

| Feed B | |
| --- | --- |
| Ingredients | Parts by Weight |
| Methyl methacrylate | 694.5 |
| Butyl acrylate | 694.5 |
| Hydroxypropyl methacrylate | 70.2 |
| Acrylic acid | 30 |

| Feed C | |
| --- | --- |
| Ingredients | Parts by Weight |
| ARMEEN DMCD[1] | 9 |
| Methanesulfonic acid (70% aqueous) | 5 |
| Deionized water | 127.3 |

| Feed D | |
| --- | --- |
| Ingredients | Part by Weight |
| Dimethylaminoethyl methacrylate | 15 |
| Methanesulfonic acid (70% aqueous) | 13.1 |
| Deionized water | 911.8 |

[1]Dimethyl lauryl amine, a product of Armak Industrial Chemicals Division.

The reactor charge was agitated and heated to a temperature of about 70° C. followed by the addition of Feed A. The reaction mixture was then held at this temperature until it turned blue in color indicating the initiation of polymerization. Feeds B and D were then simultaneously added over a period of 3 hours at the rates of 138 cc. and 70 cc. per 15 minutes, respectively. At the completion of the addition of Feeds B and D, the reaction mixture was held for 2 hours at 75° C. Thereafter, the mixture was cooled and then filtered. Resulting was a latex having a resin solids content of 36.8 percent, a pH of about 2.9 and a Brookfield viscosity of 32 centipoises measured at 22° C. with a No. 1 spindle at 50 rpm's.

Example 4

The following example shows the preparation of the acrylic latices of the present invention comprising an internal curing agent comprising a blocked isocyanate group.

| Reactor Charge | |
| --- | --- |
| Ingredients | Parts by Weight |
| Deionized water | 709.2 |
| Feed C | 8.4 |
| Ferric sulfate (1.0% aqueous) | 0.3 |
| Feed D (10% aqueous) | 120.9 |

| Feed A | |
| --- | --- |
| Ingredient | Parts by Weight |
| Hydrogen peroxide (30% aqueous) | 5.13 |

| Feed B | |
| --- | --- |
| Ingredients | Parts by Weight |
| Methyl methacrylate | 230.6 |
| Butyl acrylate | 221.4 |
| Hydroxypropyl methacrylate | 28.8 |
| Styrene | 63.3 |
| Isocyanatoethyl methacrylate | 29.1 |
| Styrene | 29.1 |
| 2-ethylhexanol | 25.5 |

| Feed C | |
| --- | --- |
| Ingredients | Parts by Weight |
| ARMEEN DMCD | 2.0 |
| Methanesulfonic acid (70% aqueous) | 1.17 |
| Deionized water | 25.0 |

| Feed D |
| --- |

| Ingredients | Parts by Weight |
| --- | --- |
| Dimethylaminoethyl methacrylate | 14.8 |
| Methanesulfonic acid (70% aqueous) | 13.1 |
| Deionized water | 213.7 |

*The isocyanatoethyl methacrylate in the styrene monomer solution was blocked with the 2-ethylhexanol before it was copolymerized.

The reactor charge was agitated and heated to a temperature of about 72° C., followed by the addition of 60 cc. of Feed C, and all of Feed A. The reaction mixture was then held at this temperature until it turned blue in color indicating the initiation of polymerization. Feed B was added over a period of 3 hours at the rate of 45 cc. per 15 minutes. The temperature of the reaction mixture rose to 79° C., was allowed to cool to 75° C., at which temperature 38 cc. of Feed D were added at one-hour intervals, with the temperature maintained within the range of 76°-75° C. At the completion of the addition of Feeds D and B, the reaction mixture was held at 75° C. for 2 hours. Thereafter, the mixture was cooled and then filtered. Resulting was a latex having a resin solids content of 40 percent, a pH of 2.7 and a Brookfield viscosity of 54 centipoises measured at 50 rpm's with a No. 1 spindle, at 22° C.

We claim:

1. A process for preparing a stable cationic acrylic latex; said process comprises copolymerizing ethylenically unsaturated monomers in an acidic medium in the presence of a cationic surfactant in which the gegen-ion of the cationic surfactant is derived from methanesulfonic acid.

2. A process of claim 1, wherein at least one of the ethylenically unsaturated monomers is amino group-containing.

3. A cationic acrylic latex prepared as recited in claim 1.

* * * * *